T. JOBE.
Wheel-Cultivator.
No. 61,836.
Patented Feb. 5, 1867.
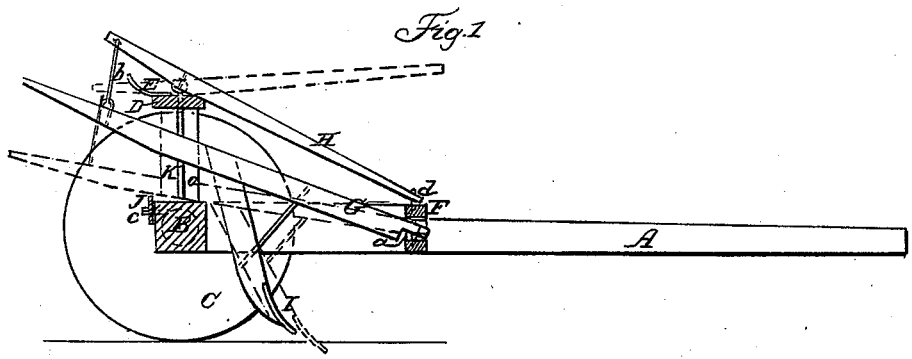
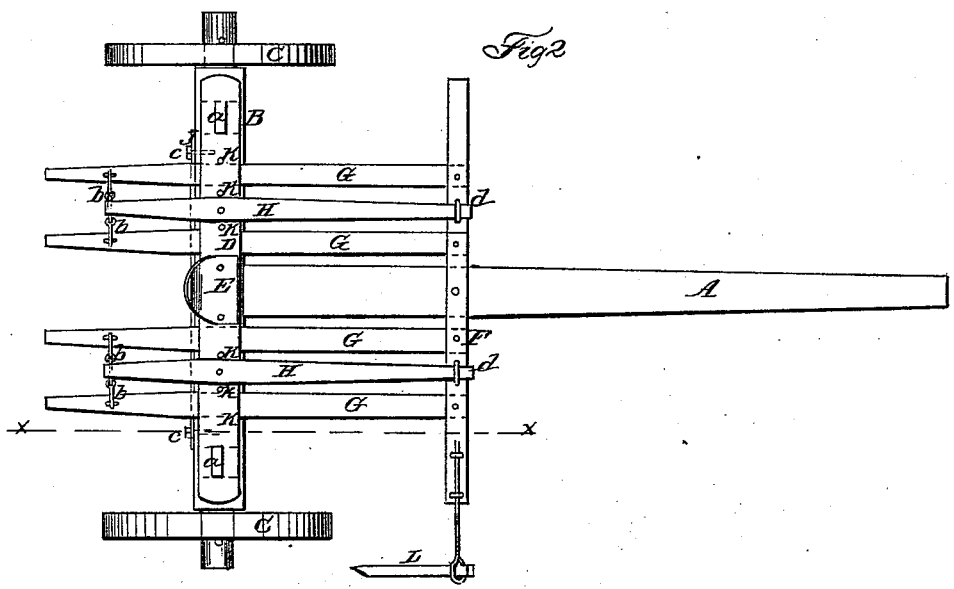
Witnesses.
Theo Fusch
J. A. Service
Inventor
Thos Jobe
Per Munn &
Attys

United States Patent Office.

THOMAS JOBE, OF CLARKSVILLE, OHIO.

Letters Patent No. 61,836, dated February 5, 1867.

---

IMPROVEMENT IN CULTIVATORS.

---

The Schedule referred to in these Letters Patent and making part of the same.

---

TO ALL WHOM IT MAY CONCERN:

Be it known that I, THOMAS JOBE, of Clarksville, in the county of Clinton, and State of Ohio, have invented a new and improved Cultivator; and I do hereby declare that the following is a full, clear, and exact description thereof, which will enable those skilled in the art to make and use the same, reference being had to the accompanying drawing, forming part of this specification, in which—

Figure 1 is a side sectional view of my invention, taken in the line $x\ x$, fig. 2.

Figure 2 is a plan or top view of the same.

Similar letters of reference indicate corresponding parts.

This invention relates to a new and improved cultivator for general purposes; that is to say, one which may be used for cultivating or ploughing plants grown in hills or drills, or used for eradicating weeds, and rendering the earth light and friable preparatory to the sowing of grain.

A represents a draught-pole, to the rear end of which a bar, B, is attached at right angles, said bar having a wheel, C, on each end of it, and serving as an axle. This bar or axle has uprights, $a$, framed into it, one near each end, the upper ends of said uprights having tenons cut on them to fit the mortises in a bar, D, on which the driver's seat E is secured. F is a bar, secured transversely to the draught-pole A, parallel with the bar or axle B. This bar F is slotted longitudinally to receive the front ends of beams G, which are secured in F by pins, $a'$, passing vertically through it, as shown in fig. 1. On the bar D there are secured two levers, H H, the rear ends of which are connected by rods or links, $b$, with the beams G, two of the latter being connected with each lever, and a lever being at each side of the driver's seat, as shown clearly in fig. 2. The driver, by actuating these levers from his seat, E, may raise and lower the beams G, to which the ploughs I are attached, and when walking behind the device, the beams G may be raised directly by hand, the rear ends of G projecting sufficiently far behind the bar or axle B to admit of that result. When the ploughs are at work, the beams G rest upon an adjustable bar, J, which is secured to the rear of the bar or axle B by set-screws, $c$, the latter passing through vertical oblong slots in bar J, and admitting of the bar being adjusted higher or lower so that the ploughs may penetrate into the earth at a greater or less distance, as may be required. Rods, K, pass vertically through the bar D, and into the axle B, to serve as guides for the beams G. The whole arrangement is extremely simple and efficient, and the ploughs may be manipulated with the greatest facility. A marker, L, may also be attached to one end of the bar F, to serve as a guide and admit of the device being used to make furrows or drills to receive seed, and on the top of said bar F, hooks, $d$, may be attached to receive the front ends of the levers H, when it is desired to sustain the ploughs above the surface of the ground, as in drawing the device from place to place.

Having thus described my invention, what I claim as new, and desire to secure by Letters Patent, is—

The arrangement of the plough beams G and levers H, applied to the frame of the device, in combination with the adjustable bar $a$ at the rear of the axle B, all arranged to operate substantially in the manner as and for the purpose set forth.

<div style="text-align:right">his<br>THOMAS ⋈ JOBE.<br>mark.</div>

Witnesses:
 THOS. H. TOWNSEND,
 JOSEPH HOGAN.